F. C. THOMAS.
RESILIENT WHEEL.
APPLICATION FILED MAR. 4, 1908.
920,690.
Patented May 4, 1909.
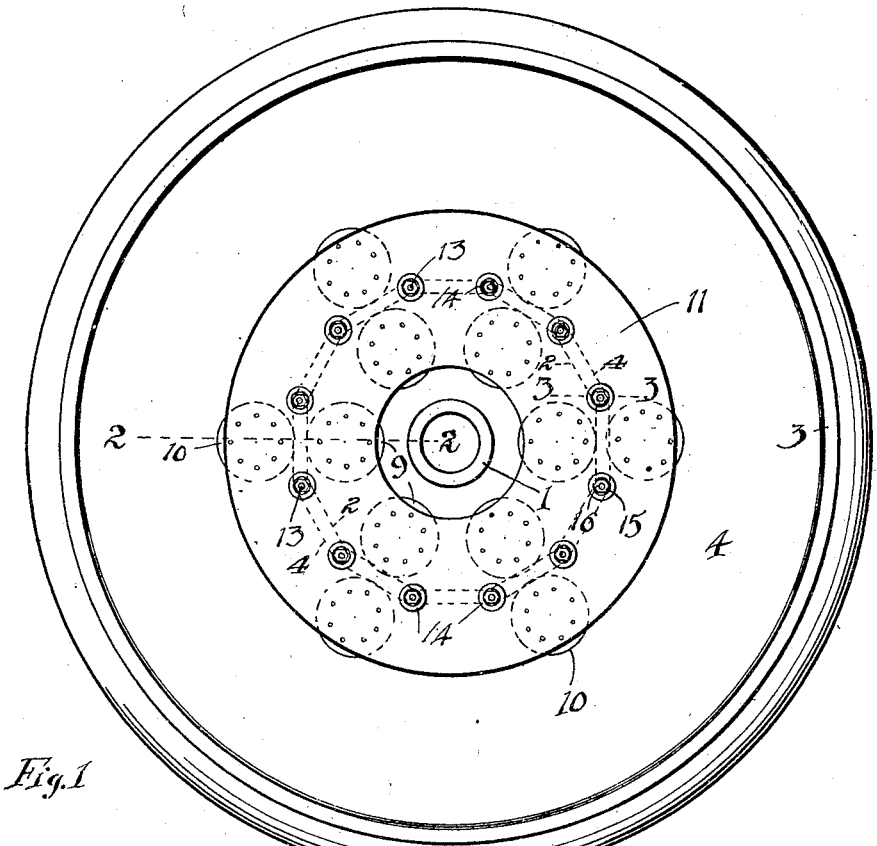
Fig.1
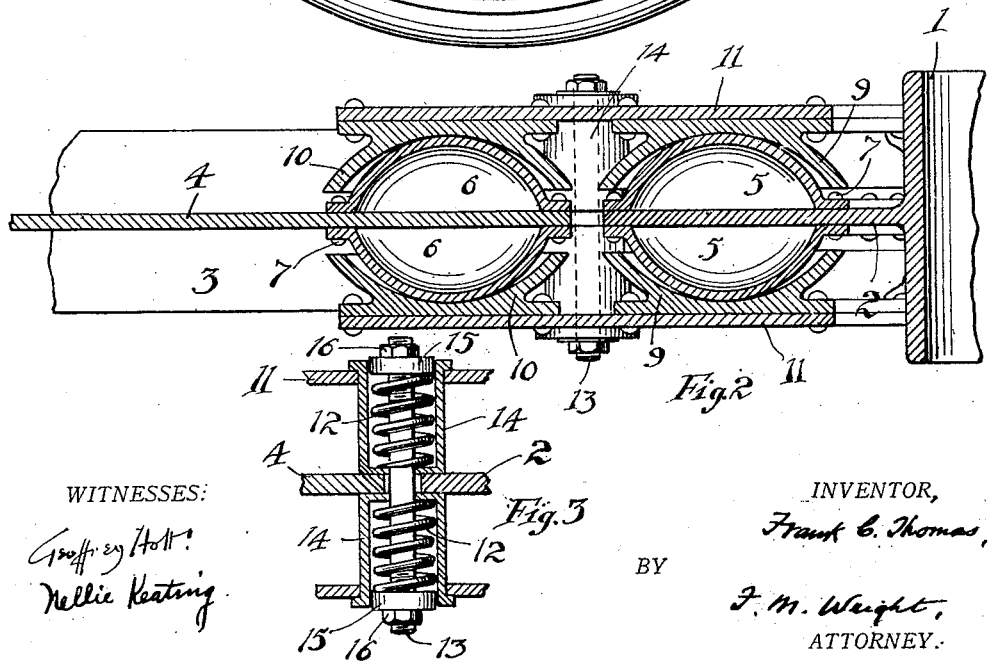
WITNESSES:
INVENTOR,
Frank C. Thomas,
BY
F. M. Wright,
ATTORNEY.

UNITED STATES PATENT OFFICE.

FRANK C. THOMAS, OF MILL VALLEY, CALIFORNIA.

RESILIENT WHEEL.

No. 920,690.　　　Specification of Letters Patent.　　　Patented May 4, 1909.

Application filed March 4, 1908. Serial No. 419,081.

*To all whom it may concern:*

Be it known that I, FRANK C. THOMAS, a citizen of the United States, residing at Mill Valley, in the county of Marin and State of California, have invented new and useful Improvements in Resilient Wheels, of which the following is a specification.

The object of the present invention is to provide a wheel sufficiently resilient to be used as a substitute for the wheels equipped with pneumatic tires, now in general use for automobiles and the like, and which will be free from the objections to pneumatic tires, such as rapid wear, and liability to puncture and disruption.

In the accompanying drawing, Figure 1 is a side view of a wheel of my improved construction; Fig. 2 is an enlarged detail section on the line 2—2 of Fig. 1; Fig. 3 is a similar section on the line 3—3 of Fig. 1.

Referring to the drawing, 1 indicates the hub of the wheel having extending therefrom an inner web or ring 2. The rim 3 of the wheel is secured to an outer ring 4 extending around the inner ring 2, but spaced therefrom. On said inner and outer rings 2, 4, respectively, at the adjacent margins of said rings, and on each side thereof, are series of inner and outer hollow bosses 5, 6, secured by rivets 7, the bosses of the two series registering radially with each other respectively. Said bosses, in the normal condition of the wheel, rest centrally within concave sockets 9, 10, secured to annular plates 11, which plates substantially cover said sockets and bosses. Said plates are held together by means of pairs of springs 12, each pair being coiled around the opposite ends of a tie bar 13, the springs being received within flanged cups 14, and being retained within said cups by means of washers 15, resting against the outer end of the springs, nuts 16 being screwed upon the threaded outer ends of said tie bar. For each pair of radially registering bosses and sockets there are two pairs of these springs, arranged relatively to each other in a direction at right angles to the radius through the bosses. By tightening up the nuts, the pressure of the springs and therefore the resilience of the wheel can be varied.

The device operates in the following manner. Upon meeting any obstruction in the road tending to move the rim upward toward the hub, the effect is to move the lower portion of the outer ring 4 toward the inner ring 2, and the upper portion of the outer ring 4 away from the inner ring 2. The lower bosses 6 of the outer ring are thus moved toward the lower bosses 5 of the inner ring, while the upper bosses 6 of the outer ring are moved away from the upper bosses 5 of the inner ring. The effect in both cases is the same, namely, to spread the plates 11 from each other at both top and bottom, this being occasioned by the wedge-shaped action of the bosses within the concave sockets, when they move from their normal positions in the center of said sockets. It will thus be seen that any radial movement of either ring relative to the plates produces an axial movement of said plates relative to each other and to the ring. The spreading of the plates 11 is resisted by the springs 12, all of the springs of the wheel acting simultaneously to so resist said separation. There is thus a resilient resistance offered by the springs to any movement of the center of the wheel relatively to its rim, so that any sudden jar or shock caused by meeting any inequality in the ground in running is resiliently taken up by the springs, instead of being transmitted unchanged to the hub of the wheel.

I am aware that it has been proposed to use balls, each in two cavities, formed, the one in an inner ring carried by the hub and the other in an outer ring attached to the rim of the wheel, and springs for normally maintaining said balls in their central position. My invention differs from that construction, in that the rounded bosses 5, 6, which act as wedges within the sockets attached to the plates 11 are permanently secured to the inner and outer rings respectively, so that they cannot possibly become dislodged and thus lost by any unusual or extraordinary jar upon the vehicle.

I claim:—

1. In a resilient wheel, the combination of a hub, an inner ring attached thereto, a rim, an outer ring attached thereto, inner and outer circular series of bosses attached respectively to said inner and outer rings on both sides thereof, annular plates on both sides of said rings, sockets secured to said plates and receiving said bosses, and springs arranged to normally draw said plates toward each other, substantially as described.

2. In a resilient wheel, the combination of a hub, an inner ring attached thereto, a rim, an outer ring attached thereto, inner and outer circular series of bosses attached respectively to said inner and outer rings on both sides thereof, annular plates on both sides of said rings, sockets secured to said plates and receiving said bosses, cups in said plates in pairs, coiled springs in said cups, and a tie bolt for each pair of springs, arranged to hold the outer ends of the springs, against movement from each other, substantially as described.

In testimony whereof I have hereunto set my hand in the presence of two subscribing witnesses.

FRANK C. THOMAS.

Witnesses:
F. M. WRIGHT,
D. B. RICHARDS.